US010065143B2

(12) United States Patent
Beier

(10) Patent No.: US 10,065,143 B2
(45) Date of Patent: *Sep. 4, 2018

(54) FILTRATION MONITORING SYSTEM

(71) Applicant: Michael B. Beier, Hendersonville, TN (US)

(72) Inventor: Michael B. Beier, Hendersonville, TN (US)

(73) Assignee: Complete Filter Management LLC, Omaha, NE (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/211,587

(22) Filed: Jul. 15, 2016

(65) Prior Publication Data
US 2016/0317962 A1 Nov. 3, 2016

Related U.S. Application Data

(63) Continuation of application No. 14/079,428, filed on Nov. 13, 2013, now Pat. No. 9,517,429.

(60) Provisional application No. 61/725,556, filed on Nov. 13, 2012.

(51) Int. Cl.
B01D 46/42 (2006.01)
B01D 46/00 (2006.01)

(52) U.S. Cl.
CPC ....... B01D 46/429 (2013.01); B01D 46/0086 (2013.01)

(58) Field of Classification Search
CPC .. B01D 46/429; B01D 46/46; B01D 46/0086; B01D 46/446; B01D 37/046; B01D 35/143
See application file for complete search history.

(56) References Cited

U.S. PATENT DOCUMENTS

| | | | |
|---|---|---|---|
| 4,786,295 A * | 11/1988 | Newman | B01D 46/0023 340/607 |
| 8,186,230 B1 * | 5/2012 | Kelley | G01F 1/42 73/861.42 |
| 9,517,429 B2 * | 12/2016 | Beier | B01D 46/0086 |
| 2002/0078173 A1 | 6/2002 | Horn et al. | |
| 2005/0061155 A1 * | 3/2005 | Franey | B01D 46/0086 96/421 |
| 2005/0247194 A1 | 11/2005 | Kang et al. | |
| 2006/0032245 A1 * | 2/2006 | Kates | F24F 3/1603 62/129 |
| 2006/0259273 A1 | 11/2006 | Goldberg | |
| 2008/0198896 A1 | 8/2008 | Nair | |
| 2009/0019946 A1 | 1/2009 | Mossman | |
| 2010/0153023 A1 | 6/2010 | Parham et al. | |
| 2010/0228805 A1 | 9/2010 | McCoy et al. | |
| 2011/0023709 A1 * | 2/2011 | Bosshard | B01D 46/0086 95/19 |

(Continued)

Primary Examiner — Helen Kwok
(74) Attorney, Agent, or Firm — Suiter Swantz pc llo

(57) ABSTRACT

The present disclosure is a filtration monitoring system. Filtration monitoring system may include a sensor configured to measure a characteristic of usage of a monitored filter. The sensor may be communicatively coupled to a controller which is configured to transfer measured data to a server of the filter monitoring system. Server may be configured to store historical data regarding representative filter usage and may determine a predicted expiration time for a monitored filter which may be adjusted based upon the measured data from the sensor.

19 Claims, 8 Drawing Sheets

(56) References Cited

U.S. PATENT DOCUMENTS

| | | | |
|---|---|---|---|
| 2011/0054811 A1 | 3/2011 | Contini et al. | |
| 2011/0061527 A1 | 3/2011 | Sullivan | |
| 2011/0185895 A1* | 8/2011 | Freen | B01D 46/42 95/25 |
| 2011/0195652 A1* | 8/2011 | Smith | F24F 11/008 454/184 |
| 2012/0125592 A1 | 5/2012 | Fadell et al. | |
| 2012/0318073 A1* | 12/2012 | Zavodny | B01D 46/0086 73/862.581 |
| 2012/0323375 A1* | 12/2012 | Dean-Hendricks | F24F 3/1603 700/276 |
| 2012/0323377 A1* | 12/2012 | Hoglund | F24F 11/0086 700/277 |
| 2013/0158717 A1* | 6/2013 | Zywicki | F24F 11/0086 700/276 |
| 2013/0289919 A1* | 10/2013 | Wilson, Jr. | G01N 21/59 702/104 |

* cited by examiner

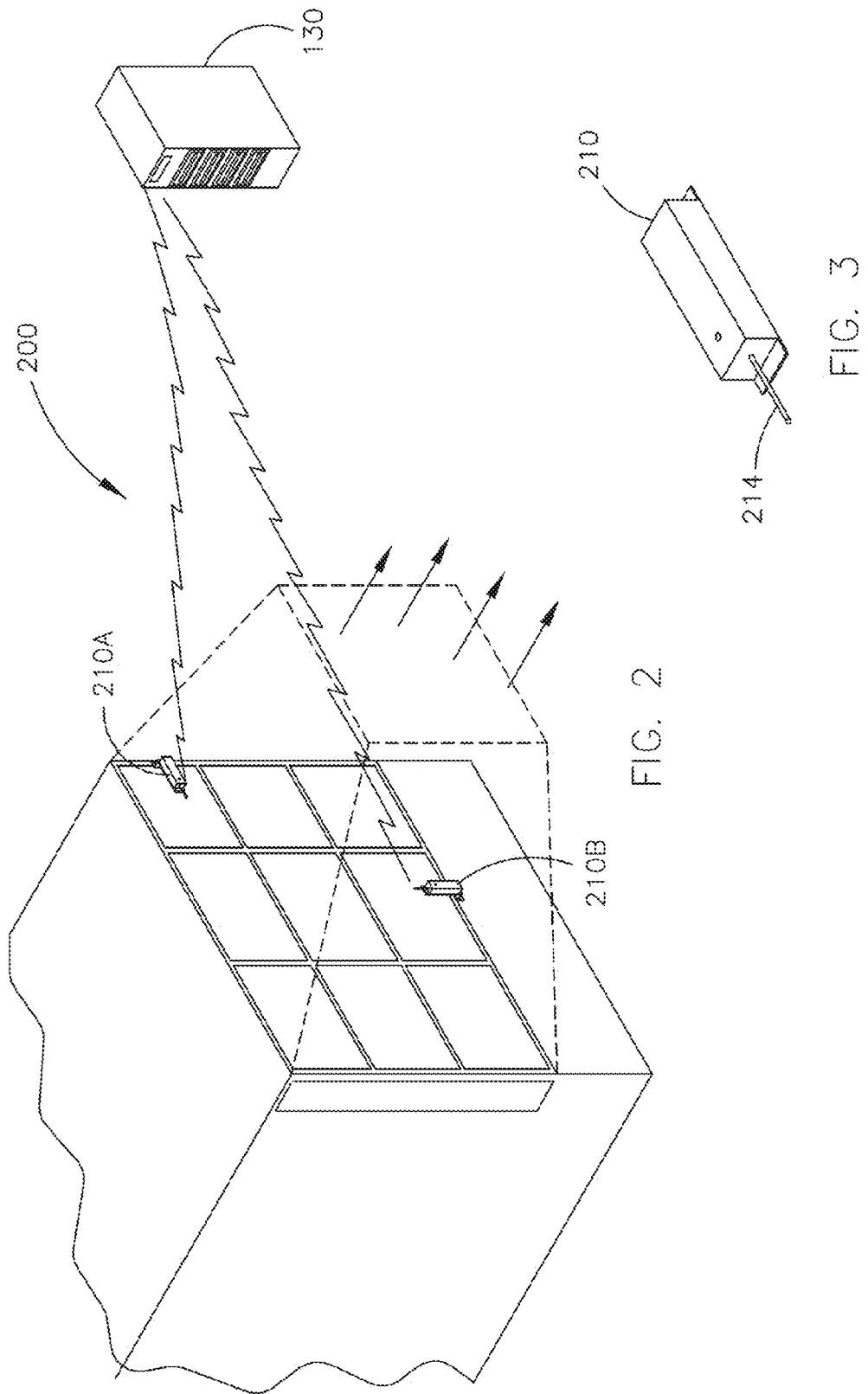

FILTRATION MONITORING SYSTEM

CROSS REFERENCE TO RELATED APPLICATIONS

The present application claims the benefit under 35 U.S.C. § 120 of U.S. patent application Ser. No. 14/079,428 filed Nov. 13, 2013, pending. U.S. patent application Ser. No. 14/079,428 filed Nov. 13, 2013 claims the benefit under 35 U.S.C. § 119 of U.S. Provisional Application No. 61/725, 556, filed on Nov. 13, 2012.

The U.S. patent application Ser. No. 14/079,428 filed Nov. 13, 2013 and U.S. Provisional Patent Application No. 61/725,556 are hereby incorporated by reference in their entireties.

TECHNICAL FIELD

The present disclosure generally relates to the field of monitoring systems, and more particularly to a filtration monitoring system.

BACKGROUND

Various types of products, including HVAC systems, air handling equipment, and finishing spray booths employ various types of filters to remove impurities from the airflow. These respective systems may operate in an optimal fashion when the filters are regularly replaced. However, it is expensive to replace filters, and replacing filters prior to their expiration can exacerbate these costs. Furthermore, it may require almost-constant supervision to identify the exact moment the filters reach an end of their useful life.

Conventional filters typically include a guide for replacement of the filter based upon a suggested time or use interval, such as every three months, or a given value, such as static pressure levels. However, filters operate in many different environments and expiration of filters may fluctuate due to varying operating conditions.

SUMMARY

Accordingly, the present disclosure is directed to a filtration monitoring system. Filtration monitoring system may include a sensor configured to measure at least one characteristic of usage of a monitored filter. The sensor may be communicatively coupled to a controller which is configured to transfer measured data to a server of the filter monitoring system. Server may be configured to store historical data regarding filter usage and may determine a predicted expiration time for the monitored filter which may be adjusted based upon the measured data from the sensor.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the present disclosure may be better understood by those skilled in the art by reference to the accompanying figures in which:

FIG. 2 illustrates a filtration monitoring system in accordance with an embodiment of the present disclosure;

FIG. 3 depicts a device of the filtration monitoring system in accordance with an embodiment of the present disclosure;

DETAILED DESCRIPTION

Reference will now be made in detail to the subject matter disclosed, which is illustrated in the accompanying drawings.

Before any embodiments of the disclosure are explained in detail, it is to be understood that the embodiments may not be limited in application according to the details of the structure or the function as set forth in the following descriptions or illustrated in the figures. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage. It is further contemplated that like reference numbers may describe similar components and the equivalents thereof.

Figure 1:
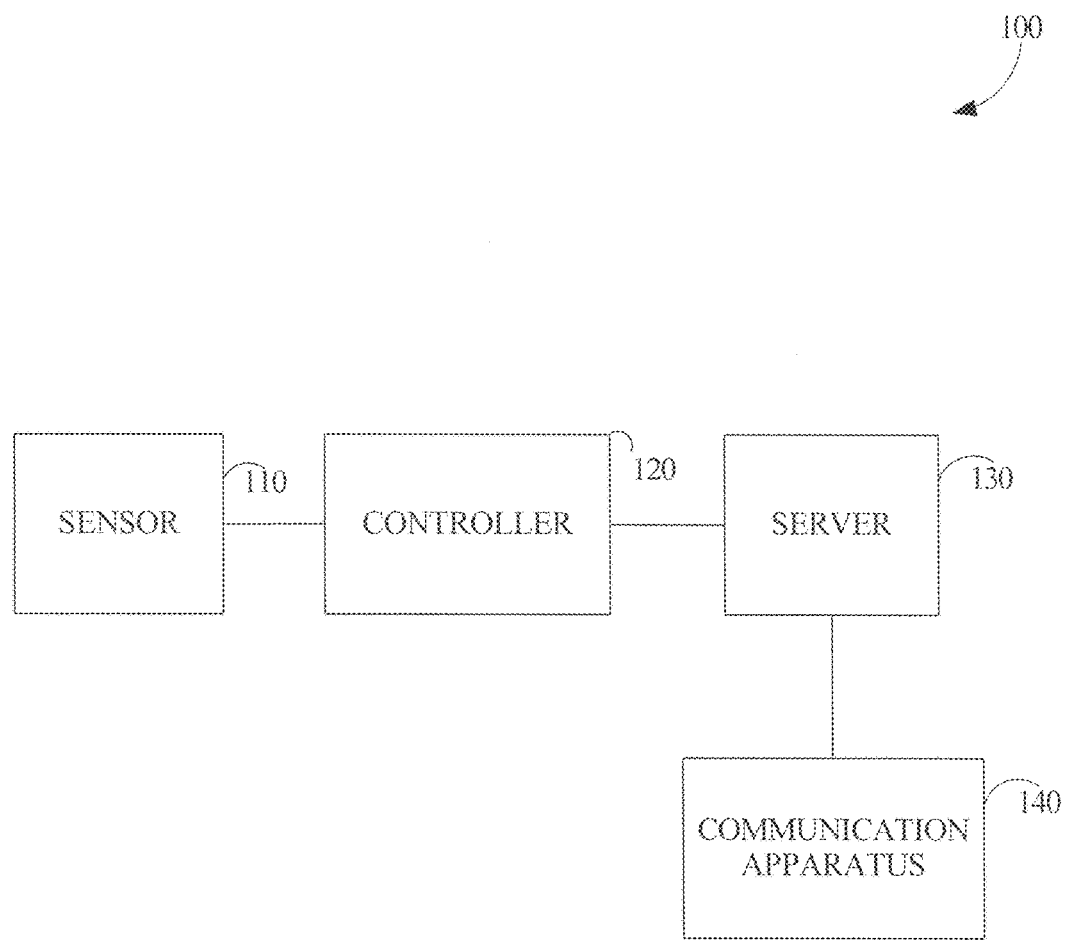
FIG. 1 is a block diagram of a filtration monitoring system in accordance with an embodiment of the present disclosure.

Referring to FIG. 1, a block diagram of a filtration monitoring system 100 in accordance with an embodiment of the present disclosure is shown. Filtration monitoring system 100 may determine a predicted expiration time of a monitored filter to determine a time for replacement of the monitored filter. Filtration monitoring system 100 may include a sensor 110 configured to measure at least one characteristic of usage of a monitored filter. It is contemplated that a monitored filter may be any type or kind of filter in which a sensor 110 may be measuring a characteristic of usage of the filter. Sensor 110 may be communicatively coupled to a controller 120. Controller 120 may be configured to transfer measured data received from sensor 110 to a server 130 of the filter monitoring system 100. Server 130 may be configured to store historical data regarding filter usage and may determine a predicted expiration time for the monitored filter. Server 130 may further refine the predicted expiration time of the monitored filter based upon receipt of measured data from the sensor 110. Filtration monitoring system 100 may determine a predicted expiration time of a filter in residential, commercial and industrial HVAC systems, air handling equipment, spray booths, water filters and the like.

It is contemplated that the predicted expiration time may account for predicted non-use of the filter. Non-use of a filter may be determined by server 130 by a zero reading measurement of sensor 110. For example, if a system that includes a monitored filter is not operating and sensor 100 takes a measurement, a zero reading may be received. The zero reading may alert the server 130 that the monitored filter is not in use. A monitored filter may be utilized on weekdays and not used on weekends. If it is Friday morning and there is an estimated 12 hours of operating use remaining, the predicted expiration time may be Monday morning at 11:00 AM based upon nine hours of use on Friday and three hours of use on Monday, thus accounting for non-use in the evenings and on weekends. It is contemplated that server 130 may be programmed for monitoring of a particular monitored filter by allowing a user to enter times of expected use and expected non-use which can be randomly verified with measured data from sensor 110.

Server 130 may analyze historical usage data for a similar type of filter and may determine a predicted expiration time of a monitored filter. The predicted expiration time may be adjusted based upon measured data from the sensor 110. For example, if the measured data from sensor 110 indicates more wear than expected based upon the historical usage data, then the predicted expiration time may be reduced. Unlike other conventional monitoring systems, such as home security systems, which only react to signals received from sensors, the filtration monitoring system uses the measured data from sensor 110 to adjust the predicted expiration time accordingly. Conventional monitoring systems may rely upon a timer which only measures elapsed time of usage. Filtration monitoring system 100 may account for variables in the environment and fluctuations in the operating conditions of the equipment employing the filter, such as spray volume, spray application transfer efficiencies, air pressure, motor efficiency changes and the like.

Server 130 may be configured to direct the controller 120 and sensor 110 to power on and take a measurement. It is contemplated that not many measurements may be necessary initially after a filter change, but can be executed to determine if the equipment is in use or not in use. By foregoing many measurements initially, battery power usage may be reduced. Server 130 may increase a frequency of measurements by sensor 110 based on results of the measurements, particularly when the predicted expiration time for the filter may be closer.

Server 130 may be configured to generate a user interface viewable by a user and may be configured for multi-media notification capability. Web-based user interface, shown in an exemplary embodiment in FIG. 5, may provide advanced notification regarding the predicted expiration time for a monitored filter. Filtration monitoring system may include a communication apparatus 140. Communication apparatus 140 may be communicatively coupled with server 130. Communication apparatus 140 may include a computer, tablet, mobile device, cellular phone, smartphone and the like. Communication apparatus 140 may be associated with an internal or external maintenance person who may be responsible for replacing a monitored filter when it has expired. It is contemplated communication apparatus 140 may include a location awareness component to determine a geographical location of the communication apparatus 140. For example, communication apparatus 140 may include a global positioning system (GPS) receiver or other location awareness component. Server 130 may alert a designated person(s) via electronic mail, text, and voice phone calls via communication apparatus 140 regarding the predicted expiration time for a monitored filter. Additionally, server 130 may be configured for dispatch of service personnel or technicians via an alert sent to communication apparatus 140 at the predicted expiration time of the monitored filter. Advantageously, filter life may be maximized, labor efficiency may be increased, filter-related operating costs may be decreased and filter holding costs and inventory costs may be decreased.

Filtration monitoring system 100 may provide information to a user regarding the predicted expiration time for a monitored filter to adjust a change-out schedule to better accommodate their production requirements. For example, the predicted expiration time for a filter may be at 6:00 pm, but the maintenance person responsible for changing filters leaves at 5:00 pm. Through access to this predicted expiration time information for a monitored filter and access to the current time information and a work schedule of employees, server 130 may be configured to determine an appropriate time for replacement of the monitored filter. Server 130 may schedule the maintenance person to replace the filter before leaving for the day or assigning replacement of the filter to another person.

Referring once again to FIG. 1, filtration monitoring system 100 may include a sensor 110, a controller 120, a server 130 and a communication apparatus 140. In one embodiment, sensor 110 may be a pressure sensor. Pressure sensor may be a differential pressure sensor. Differential pressure sensor may measure a difference between two pressures, one connected to each side of the sensor. Differential pressure sensor may measure the pressure drop across a monitored filter. It is contemplated that as the pressure drop becomes larger across a filter, the filter contains more impurities and thus is closer to expiration. It is contemplated that sensor 110 may include other types of sensors without departing from the scope and intent of the present disclosure. For example, sensor 110 may include a flow sensor, an air flow sensor, air velocity sensor, air mass sensor, temperature sensor, humidity sensor and the like.

Controller 120 may be configured to transfer measured data received from sensor 110 to a server 130 of the filter monitoring system 100. Controller 120 may be coupled to server 130 via a wireless or hardwire connection. Controller 120 may be configured for wireless transmission of measured data received from sensor 110 and transfer the measured data to server 130. In one embodiment, controller 120 may include a wireless transceiver configured to receive measured data from sensor 110 and transfer the measured data to server 130. While the sensor 110 and controller 120 may be identified separately, it is contemplated that sensor 110 and controller 120 may be configured in a single component or set of components configured to measure a characteristic of use of the monitored filter and transfer the measured data to server 130.

In one embodiment, controller 120 may transmit data in accordance with IEEE 802.11 standard, generally referred as a WIFI transceiver. Controller 120 may be configured for transmission via RF, ZigBee (IEEE 802.15.4), wired Ethernet (IEEE 802.3xx), wired Serial (RS-232/RS-485), cellular, infrared, BLUETOOTH, and the like without departing from the scope and intent of the present disclosure. It is further contemplated that sensor 110 and controller 120 may be coupled to a WIFI access point whereby server 130 may be communicatively coupled to the controller 120 via the WIFI access point.

Server 130 may refer to a computing appliance and may include a database for storage of data. Server 130 may include a network interface configured to allow accessibility to a worldwide network, such as the world wide web, and generally referred as the Internet. Server 130 may include one or more processors configured to execute a program of instructions stored on computer readable media of a server 130 to receive data from controller 120 and may issue commands to controller 120 to direct sensor 110 to power on and take a measurement.

Referring to FIG. 2, a filtration monitoring system 200 in accordance with an embodiment of the present disclosure is shown. Filtration monitoring system 200 may include one or more devices 210A, 210B to measure a characteristic of a monitored filter and transfer the measured data to server 130. As shown in FIG. 2, it is contemplated that filtration monitoring system 200 may be operable to determine a predicted expiration time of a monitored filter in a paint spray booth. In such a fashion, devices 210A, 210B may be coupled to the input air flow and output air flow and configured to measure the differential pressure drop across one or more filters of the spray booth. In conventional spray booths, a pressure differential may be measured across a plurality of filters. In an embodiment of the disclosure, a pressure differential may be measured across each filter of a spray booth. However, it is contemplated that filtration monitoring system 200 may determine a predicted expiration time of a filter in a HVAC system, water filters, and the like without departing from the scope and intent of the present disclosure.

Devices 210A, 210B may be employed to measure a characteristic of usage of a monitored filter. It is contemplated that multiple devices 210A, 210B may be employed to test multiple filters, and multiple devices 210A, 210B may also measure a characteristic of usage of a single filter. FIG. 3 depicts a device 210, which is representative of device 210A, 210B of FIG. 2. Device 210 may include a sensor 110 and controller 120 as described in FIG. 1 and may encapsulate the components of sensor 110 and controller 120. Device 210 may include an antenna 214 for wireless transmission. It is contemplated that device 210 may include a power source, connected internally or externally to housing of device 210, such as a battery or rechargeable battery. Also, device 210 may include a connection to an electrical AC supply.

Device 210 may include user inputs (not shown). User inputs may be in a form of switches, buttons and the like. One user input may be a new filter input. Each time a filter is changed, the new filter input may be engaged by a user to alert device 210 of a presence of a new filter. It is contemplated that server 130 may be configured to determine a filter change based upon the change of a characteristic associated with use of the filter. For example, a large differential pressure measurement of a particular filter followed by a low differential pressure measurement of the same filter may alert server 130 to a filter change and server 130 may update its information regarding that particular filter accordingly. Additionally, device 210 may include an unscheduled reading input. An unscheduled reading input may be engaged by a user to force device 210 to take a measurement of a filter.

While filtration monitoring system 100, 200 may be employed to determine a predicted expiration time of an air filter, filtration monitoring system 100, 200 may be employed to determine expiration of an aquarium filter. A liquid sensor configured to measure a level or volume of liquid, such as water, may compare a liquid level behind the aquarium filter as compared to a front of the filter. When the level of water reaches a threshold level, it may be an appropriate time to change the filter. It is contemplated that in an aquarium filter, the water level behind the aquarium filter increases due to restrictions from contaminates in the filter. Contaminates may restrict water flow through the filter, which in turn, may increase the level of water behind the aquarium filter. The sensor may operate in a similar fashion as an automobile gas tank sensor. As the liquid level may change, a measurement may be taken. A predicted expiration time could be determined when the aquarium filter should be changed.

Figure 4:
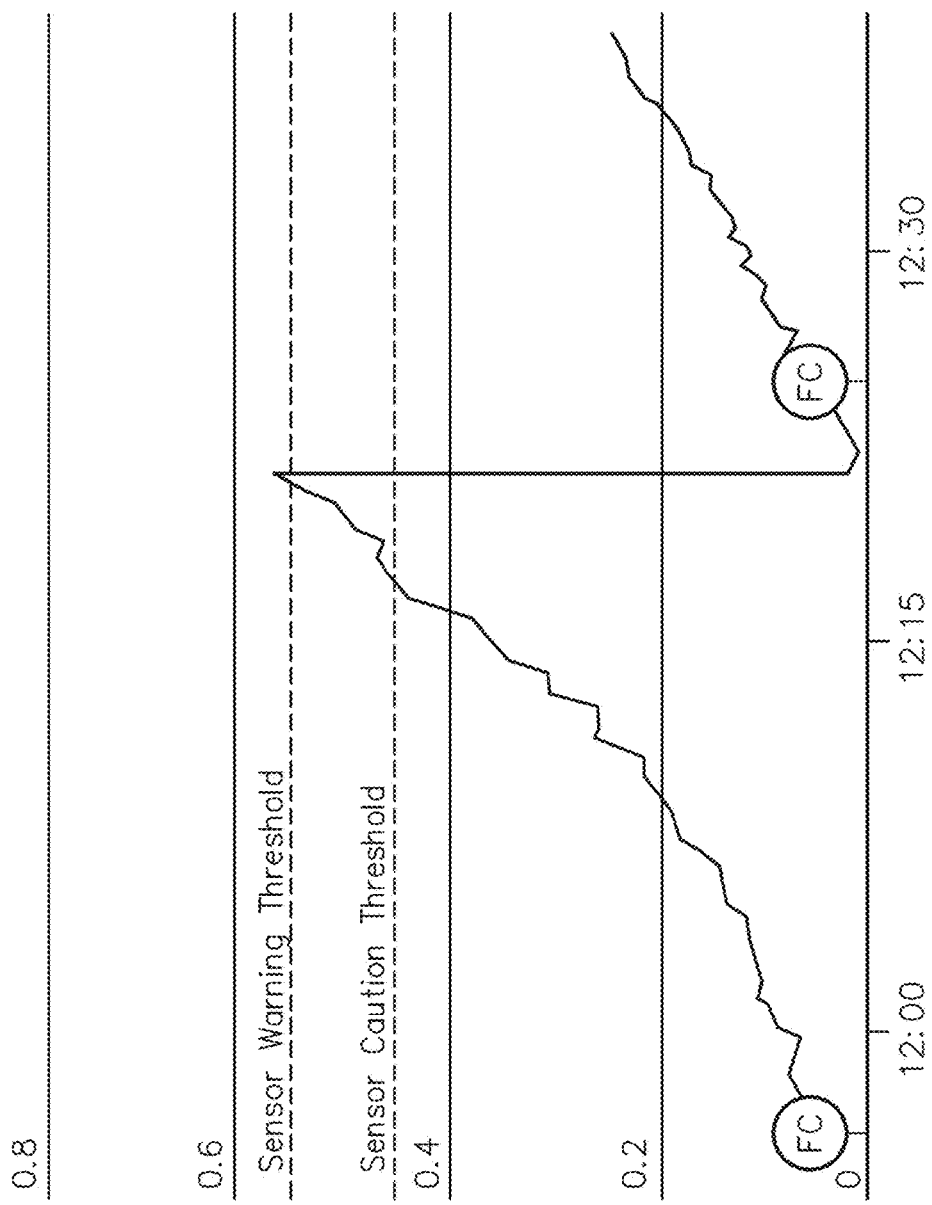
FIG. 4 depicts an exemplary graph of measured data regarding a characteristic of operation of a filter in accordance with an embodiment of the present disclosure.

Referring to FIG. 4, an exemplary graph of measured data regarding a characteristic of operation of a filter in accordance with an embodiment of the present disclosure. Graph 400 may be representative of the differential pressure measurements for a particular filter after a filter change, labeled in the graph as FC. It is contemplated that graph 400 and its incline in measured differential pressure levels may be an average type of use, however, actual results will vary and thus the measured data received from a sensor will affect the predicted expiration time of the filter. Additionally, a sensor caution threshold may be set to alert when a filter should be considered for replacement and a sensor warning threshold may be set to alert when a filter needs replacement.

It is contemplated that server 130 may maintain historical data regarding prior filter usage, like that displayed for a particular filter in FIG. 4. A representative filter may be employed to determine a predicted expiration time of a filter, currently in use. The representative filter may include a similar characteristic as a monitored filter in use. This similar characteristic may include a filter type, filter size, filter manufacturer, filter environment, time of year and the like. This data may be compiled to determine a predicted expiration time of a monitored filter with at least one similar characteristic based upon the prior historical data.

Figure 5:
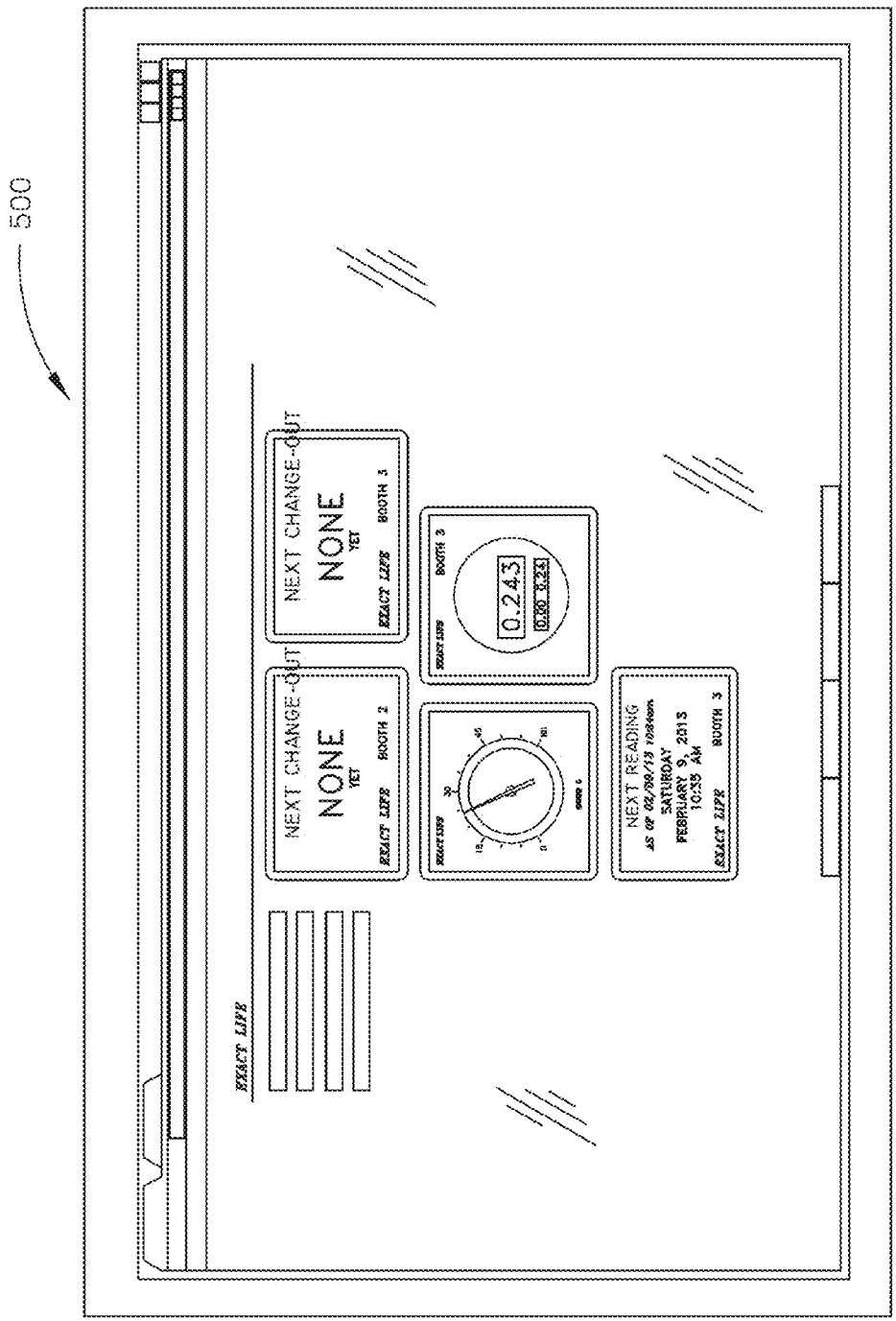
FIG. 5 depicts an exemplary user interface depicting status of a plurality of filters in accordance with an embodiment of the present disclosure.

Referring to FIG. 5, an exemplary user interface 500 depicting status of a plurality of filters in accordance with an embodiment of the present disclosure is shown. User interface 500 may be a website accessible by a user to view status of the filters being maintained by a particular user. It is contemplated that user interface 500 may include a next scheduled reading of each monitored filter and a predicted expiration time for each filter being maintained by each particular user. Also, logos and styling of the user interface 500 may be customized to a particular user whereby the particular user would only be able to view information concerning its filters. It is further contemplated that user interface 500 may include a "buy now" feature to purchase a replacement filter. Replacement filter may be delivered at the time of the predicted expiration time of a filter.

Figure 6:
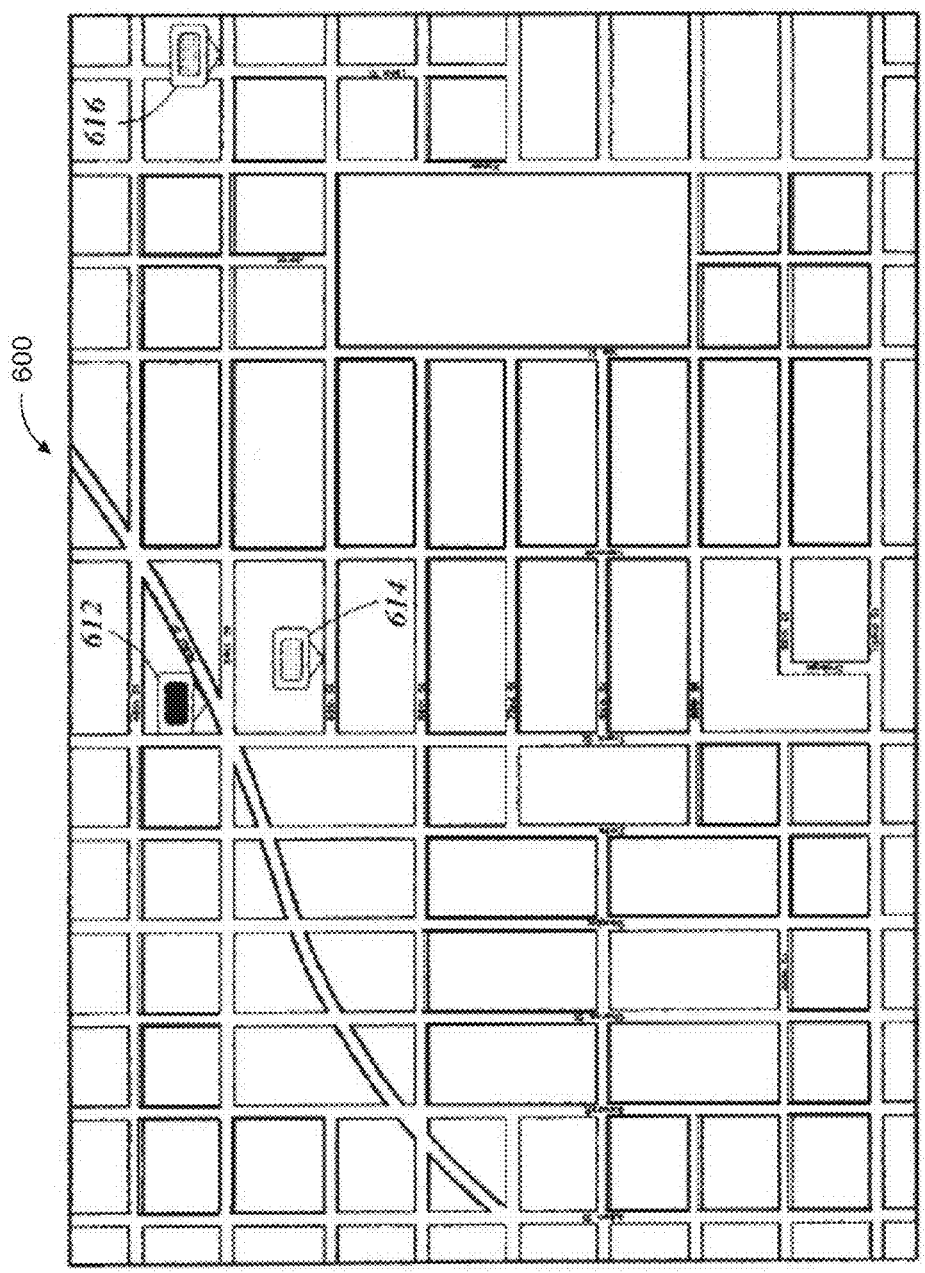
FIG. 6 depicts an exemplary service technician route for use in the scheduling of filter replacement in accordance with an exemplary embodiment of the present disclosure.

Referring to FIG. 6, an exemplary service technician route 600 for use in the scheduling of filter replacement in accordance with an exemplary embodiment of the present disclosure is shown. It is contemplated that server 130 of filtration monitoring system 100, 200 may be operable with a plurality of users of filters. As each user may include one or more filters, it is contemplated that filters may need replacement at a variety of locations. Filtration monitoring system 100, 200 may be operable with filter replacement service personnel whereby a delivery schedule is prepared based upon the predicted expiration times of the filters of the users and the geographical location of the filters. For example, it is contemplated that replacement of the filter may be desired at a time close to the predicted expiration time.

In an embodiment of the present disclosure, server 130 is configured to account for a variety of factors in the determination of a service route technician. The variety of factors may include the determination of an efficient route based upon the geographical locations of the service technician and locations requiring a filter replacement, day, time of day, traffic data, weather data, operating times for the businesses in which the filter needs replacement and the like.

Referring once again to FIG. 6, if the predicted expiration time corresponded with a filter expiring first at location 612, then a filter expiring at location 616, then a filter expiring at location 614. If the schedule was solely based upon the predicted expiration time, server 130 may produce a service technician route of location 612, and then location 616 followed by location 614. Server 130, in accordance with an embodiment of the disclosure, may be configured to determine a most efficient service technician route. Server 130 may analyze the predicted expiration time of filters and locations requiring a filter replacement, day, time of day, traffic data, weather data, operating times for the businesses in which the filter needs replacement to determine the most efficient service technician route. As such, in this example, the most efficient service technician route may be determined to replace the filter at location 616, then the filter at location 612, then the filter at location 614.

It is contemplated that server 130 may continuously update the service technician route in real-time. As such, a service technician may access his/her work schedule via a mobile device configured to access server 130 after each filter replacement in order to determine the next location for a filter replacement.

Figure 7:
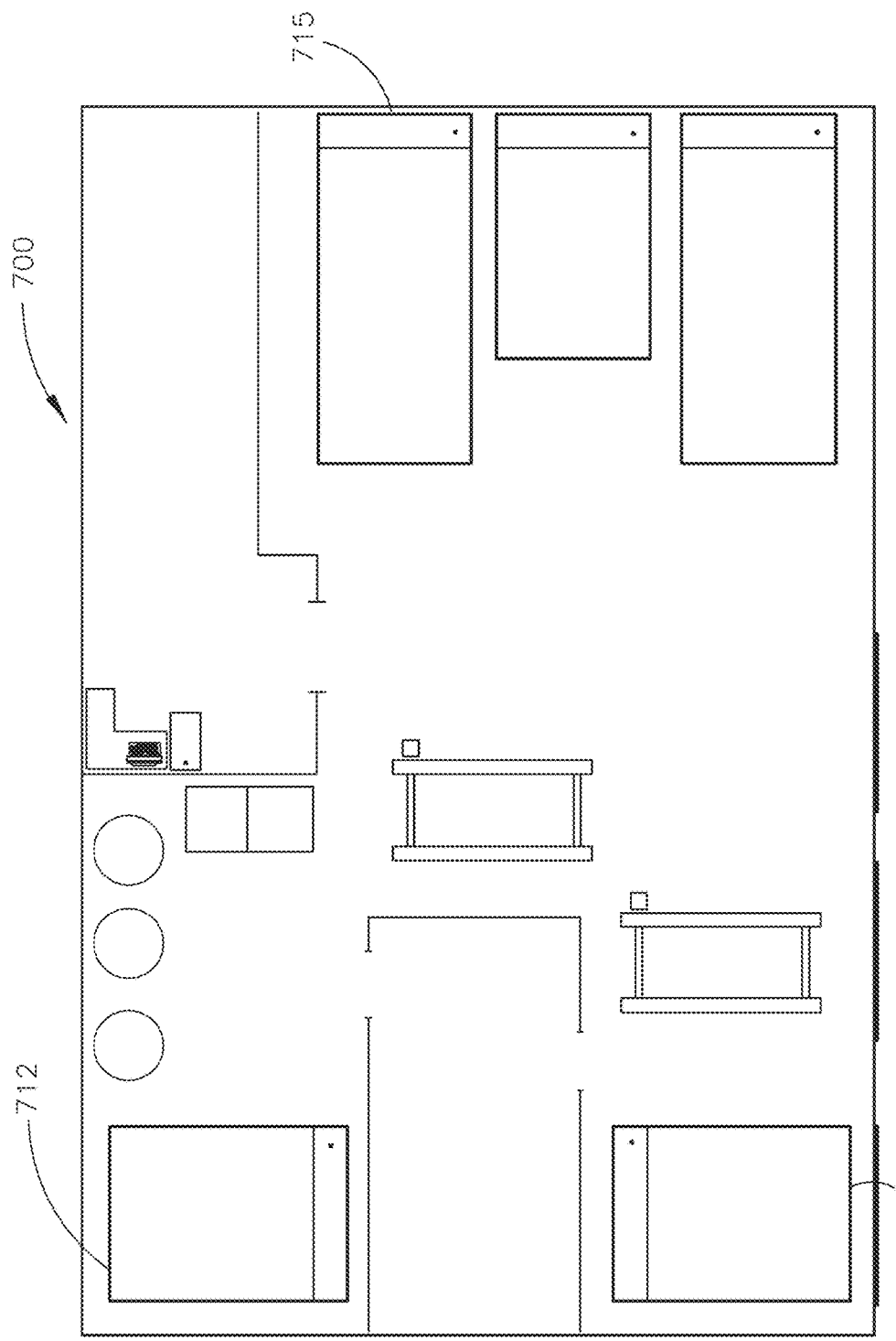
FIG. 7 depicts an exemplary diagram of a plurality of filters in accordance with an embodiment of the present disclosure.

Referring to FIG. 7, an exemplary diagram 700 of a plurality of filters in accordance with an embodiment of the present disclosure. Diagram 700 may be representative of a building location with a plurality of filters located on multiple floors. A replacement schedule for filters located in various locations of a building may be determined based upon the predicted expiration time for each filter and the location of the filter in the building. For example, the replacement schedule may be based upon the predicted expiration time of each filter and the location of each filter in the building to determine an efficient replacement schedule. For example, if the predicted expiration time corresponded with a filter expiring first at location 712, then a filter expiring at location 715, then a filter expiring at location 714. Due to the proximity of locations 712, 714, the most efficient replacement schedule may be determined to replace the filter at location 715, then the filter at location 712, then the filter at location 714.

Figure 8A:
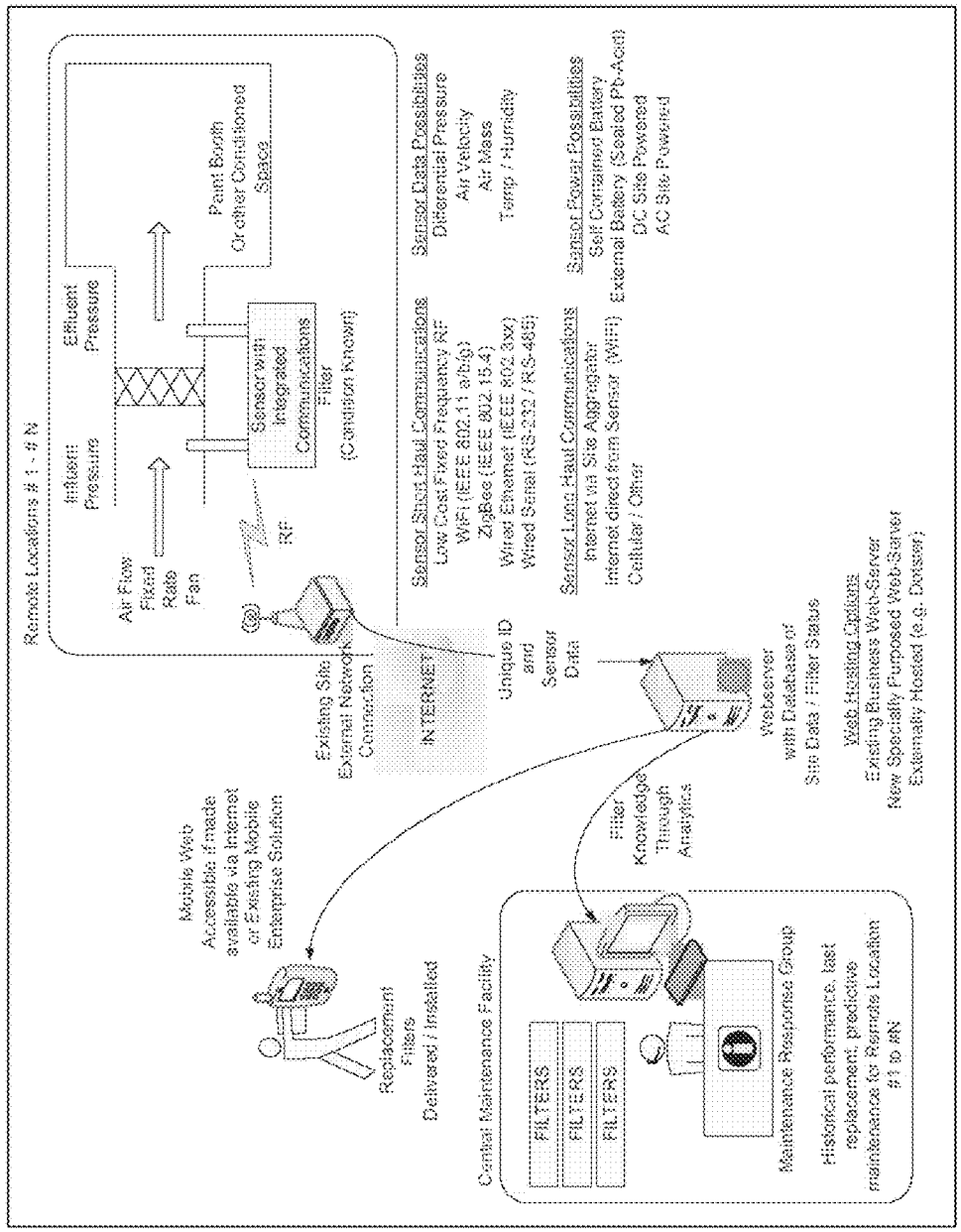
FIG. 8A and 8B depict an exemplary process flows for operation of the filtration monitoring system in accordance with an embodiment of the present disclosure.
Figure 8B:
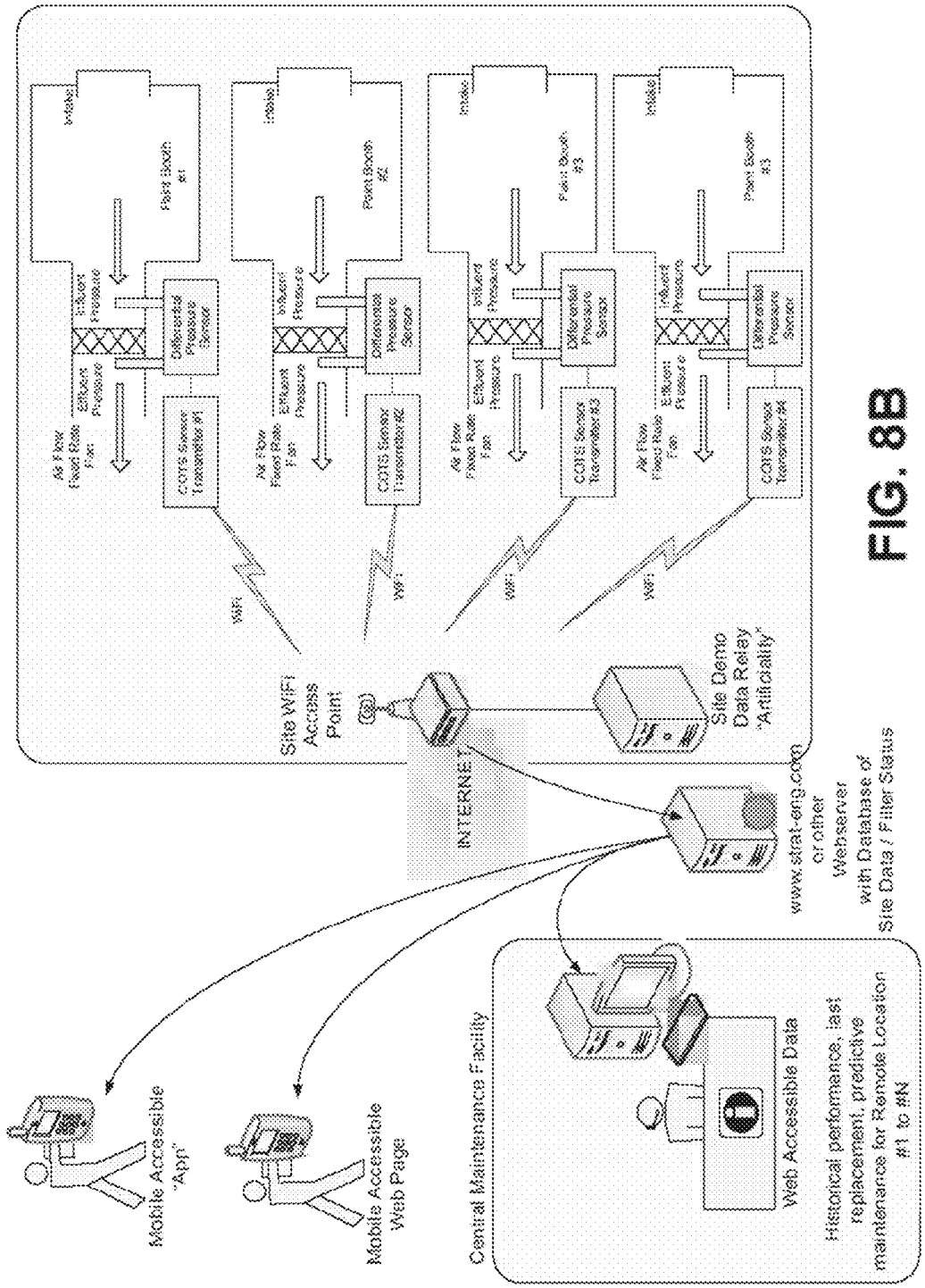

Referring to FIG. 8A and FIG. 8B, exemplary process flows for operation of the filtration monitoring system 100, 200 are shown in accordance with an embodiment of the present disclosure is shown. Filtration monitoring system may be employed to operate with a coordinated central maintenance facility with one or more service technicians employed to deliver and install filters at or near the predicted expiration time of filters.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such claims.

What is claimed is:

1. A filtration monitoring system, comprising:
a sensor configured to measure a characteristic of usage of a monitored filter;
a controller communicatively coupled to the sensor, said controller configured to receive measured data of said characteristic of usage of said monitored filter from said sensor, the controller including a wireless transceiver;
a server communicatively coupled to said controller, wherein said server is configured to retrieve historical data regarding usage of a representative filter to determine a predicted expiration time of said monitored filter, said server configured to adjust said predicted expiration time of said monitored filter based upon the measured data received from said controller, wherein said predicted expiration time accounts for estimated periods of use of said monitored filter and accounts for estimated periods of non-use of said monitored filter.

2. The filtration monitoring system of claim 1, wherein said sensor includes a differential pressure sensor.

3. The filtration monitoring system of claim 2, wherein said differential pressure sensor is configured to measure a differential pressure across said monitored filter.

4. The filtration monitoring system of claim 1, wherein said wireless transceiver is configured to transmit data according to IEEE 802.11 standard.

5. The filtration monitoring system of claim 1, wherein said representative filter shares at least one characteristic in common with said monitored filter.

6. The filtration monitoring system of claim 5, wherein said at least one characteristic in common with said monitored filter includes one of filter type, filter size, filter manufacturer, or filter environment.

7. The filtration monitoring system of claim 1, wherein said server is configured to send a notification to a user regarding the predicted expiration time of said monitored filter.

8. The filtration monitoring system of claim 1, wherein said server is configured to schedule a replacement of said monitored filter at a time approximately near the predicted expiration time of said monitored filter.

9. The filtration monitoring system of claim 1, wherein said server is configured to generate a graphical user interface accessible by a user via a worldwide network, said graphical user interface including information regarding the predicted expiration time of said monitored filter.

10. The filtration monitoring system of claim 1, wherein said monitored filter is an air filter.

11. A filtration monitoring system, comprising:
a differential pressure sensor configured to measure a differential pressure across a monitored air filter;
a wireless transceiver communicatively coupled to the differential pressure sensor, said wireless transceiver configured to receive measured differential pressure data across said monitored air filter from said differential pressure sensor;
a server communicatively coupled to said wireless transceiver, wherein said server is configured to retrieve historical data regarding usage of a representative filter to determine a predicted expiration time of said monitored air filter, said server configured to adjust said predicted expiration time of said monitored air filter based upon the measured differential pressure data received from said wireless transceiver, said server configured to retrieve the historical data regarding usage of the representative filter in combination with the measured differential pressure data to determine the predicted expiration time of the monitored air filter, said predicted expiration time accounts for estimated periods of use of said monitored air filter and accounts for estimated periods of non-use of said monitored air filter.

12. The filtration monitoring system of claim 11, wherein said representative filter is a similar filter type and a similar filter size.

13. The filtration monitoring system of claim 11, wherein said server is configured to send a notification to a user regarding the predicted expiration time of said monitored air filter.

14. The filtration monitoring system of claim 11, wherein said server is configured to schedule a replacement of said monitored air filter at a time approximately near the predicted expiration of said monitored air filter.

15. The filtration monitoring system of claim 11, wherein said server is configured to generate a graphical user interface accessible by a user via a worldwide network, said graphical user interface including information regarding the predicted expiration time of said monitored air filter.

16. A filtration monitoring system, comprising:
a sensor configured to measure a characteristic of usage of a monitored filter;
a transceiver communicatively coupled to the sensor, said transceiver configured to receive the characteristic of usage of the monitored filter from the sensor;
a server communicatively coupled to said transceiver, wherein said server is configured to retrieve historical data regarding usage of a representative filter to determine a predicted expiration time of said monitored filter, said server configured to adjust said predicted expiration time of said monitored filter based upon measured data received from said transceiver, said server configured to retrieve the historical data regarding usage of the representative filter in combination with the measured data to determine the predicted expiration time of the monitored filter, said predicted expiration time accounts for estimated periods of use of said monitored filter and accounts for estimated periods of non-use of said monitored filter.

17. The filtration monitoring system of claim 16, wherein said server is configured to send a notification to a user regarding the predicted expiration time of said monitored filter.

18. The filtration monitoring system of claim 16, wherein said server is configured to schedule a replacement of said monitored filter at a time approximately near the predicted expiration of said monitored filter.

19. The filtration monitoring system of claim 16, wherein said server is configured to generate a graphical user interface accessible by a user via a worldwide network, said graphical user interface including information regarding the predicted expiration time of said monitored filter.

* * * * *